United States Patent [19]

Lin

[11] Patent Number: 4,965,476
[45] Date of Patent: Oct. 23, 1990

[54] STABILIZED DISK DRIVE SPIN MOTOR

[75] Inventor: Joseph T. Lin, Cupertino, Calif.

[73] Assignee: Conner Peripherals, Inc., San Jose, Calif.

[21] Appl. No.: 341,070

[22] Filed: Apr. 20, 1989

[51] Int. Cl.⁵ .......................... H02K 5/24; H02K 5/00; H02K 21/12

[52] U.S. Cl. .................................. 310/51; 310/67 R; 310/91; 310/156; 360/98.07; 360/99.08; 360/99.11

[58] Field of Search ................. 310/67 R, 51, 91, 180, 310/254, 267, 268, 156; 360/98.07, 99.04, 99.08, 99.09, 99.11; 384/504, 543, 544, 586

[56] References Cited

U.S. PATENT DOCUMENTS

| | | | |
|---|---|---|---|
| 4,129,796 | 12/1978 | Papst | 310/91 |
| 4,285,016 | 8/1981 | Gilovich | 360/99.08 |
| 4,336,470 | 6/1982 | Gutris | 310/67 R |
| 4,599,664 | 7/1986 | Schuh | 360/98.07 |
| 4,612,468 | 9/1986 | Sturm et al. | 310/67 R |
| 4,634,908 | 1/1987 | Shurm | 310/67 R |
| 4,779,165 | 10/1988 | Elsaesser et al. | 360/99.08 |

Primary Examiner—Peter S. Wong
Assistant Examiner—C. E. LaBalle
Attorney, Agent, or Firm—Fliesler, Dubb, Meyer and Lovejoy

[57] ABSTRACT

An under-the-hub spin motor for a disk drive includes a stabilizer for supporting the outer diameter of the stator to stiffen the base of the spin motor. Stiffening the base in the region surrounding the shaft of the motor increases the resonant frequency of the spin motor, increasing the tolerance of the spin motor to applied vibrations. The stabilizer may be a ring formed integrally with the base plate of the disk drive or the mounting flange of the motor.

11 Claims, 5 Drawing Sheets

STABILIZED DISK DRIVE SPIN MOTOR

CROSS-REFERENCE TO RELATED APPLICATIONS

METHOD AND APPARATUS FOR BRUSHLESS DC MOTOR SPEED CONTROL, Ser. No. 163,222, filed February 26, 1988, inventors Squires, et al., assigned to the assignee of the subject Application.

UNDER-THE-HUB DISK DRIVE SPIN MOTOR, Ser. No. 301,797, filed Jan. 25, 1989, inventors Stefansky et al., assigned to the assignee of the subject Application.

BACKGROUND OF THE INVENTION

1. Field of the Invention

The present invention relates to spin motors for disk drives; more particularly, to low power and low height spin motors.

2. Description of the Related Art

Disk drive manufacturers and computer manufacturers usually establish standards for vibration and shock resistance for hard disk drives or (disk files) for data storage. The standards may be more stringent for disk drives intended for use in portable or lap-top computers or other harsh environments. Vibration and impact acceptance evaluations may be conducted by placing the drive being evaluated on a vibration table and subjecting the drive to vibrations of varying frequency and amplitude while the drive is operating. The performance of the drive is monitored to determine the frequency and amplitude of the applied vibrations which cause errors in seeking and/or track following. Seek and/or track following errors often result in "hesitations" in reading and/or writing data, and disk drives which are sensitive to applied vibrations of too low a frequency or amplitude may fail acceptance evaluations.

One effect of vibrations applied to a disk drive, and one cause of errors in seeking and/or track following is mechanical off-tracking, i.e., an unintended physical movement of the heads with respect to the disk(s). Mechanical off-tracking may be caused by movements of various structural components of the spin motor which cause the disk to tilt or wobble out of a plane normal to the axis of the motor spindle or by movements of other components of the disk drive with respect to the disk.

Among the criteria imposed on hard disk drives are vibration resistance, compactness, low weight, low power, and ease of manufacture—particularly reduced part count. All of these criteria are usually important to a computer manufacturer selecting a disk drive for use in a specific computer or for a specific type of application. Resistance to applied vibrations depends in part on the internal operating vibrations experienced by a spin motor because applied and internal vibrations may add under certain circumstances. Accordingly, improving the resistance of hard disk drives to applied vibrations is a continuing goal of disk drive manufacturers.

Spin motors for hard disk drives are conventionally brushless motors, and thus the armature of the motor will be referred to as the stator and the magnets will be referred to as the rotor. However, in a spin motor where the armature rotates and brushes are used to contact the armature, the armature would be referred to the rotor and the magnets would be referred to as the stator.

SUMMARY OF THE INVENTION

It is, therefore, an object of the present invention to provide a motor which has an improved resistance to applied vibrations.

Another object of the present invention is to provide a disk drive spin motor having an increased resonant frequency.

Another object of the present invention is to provide a low weight, low power, compact disk drive spin motor for a hard disk drive which has a resistance to applied vibrations of increased frequency and amplitude.

Another object of the present invention is to provide a spin motor for a disk drive which has a shaft supported at one end thereof by a base and which includes structure for stiffening the base in the region surrounding the shaft.

Another object of the present invention is to provide a spin motor for a disk drive having structural elements which support the stator at both its inner and outer diameters.

A motor in accordance with the present invention comprises: a shaft; a rotor; bearing means for rotatably mounting said rotor to said shaft; stator means for inducing said rotor to rotate, said stator means including a stator lamination having inner and outer diameters; and base means for supporting said shaft and for supporting said stator lamination at both said inner and outer diameters.

A spin motor in accordance with the present invention for rotating a disk in a disk drive, comprises: a base; a shaft having a first and second portions, said shaft being supported solely by mounting said first portion of said shaft in said base; first and second bearings provided at respective first and second positions on said second portion of said shaft; a hub, rotatably supported on said shaft by said first and second bearings, said hub having a disk support surface which is perpendicular to the axis of said shaft; a stator assembly mounted on said base, said stator assembly having an outer diameter; and means for bracing said stator assembly.

DESCRIPTION OF THE PREFERRED EMBODIMENTS

Figure 1:
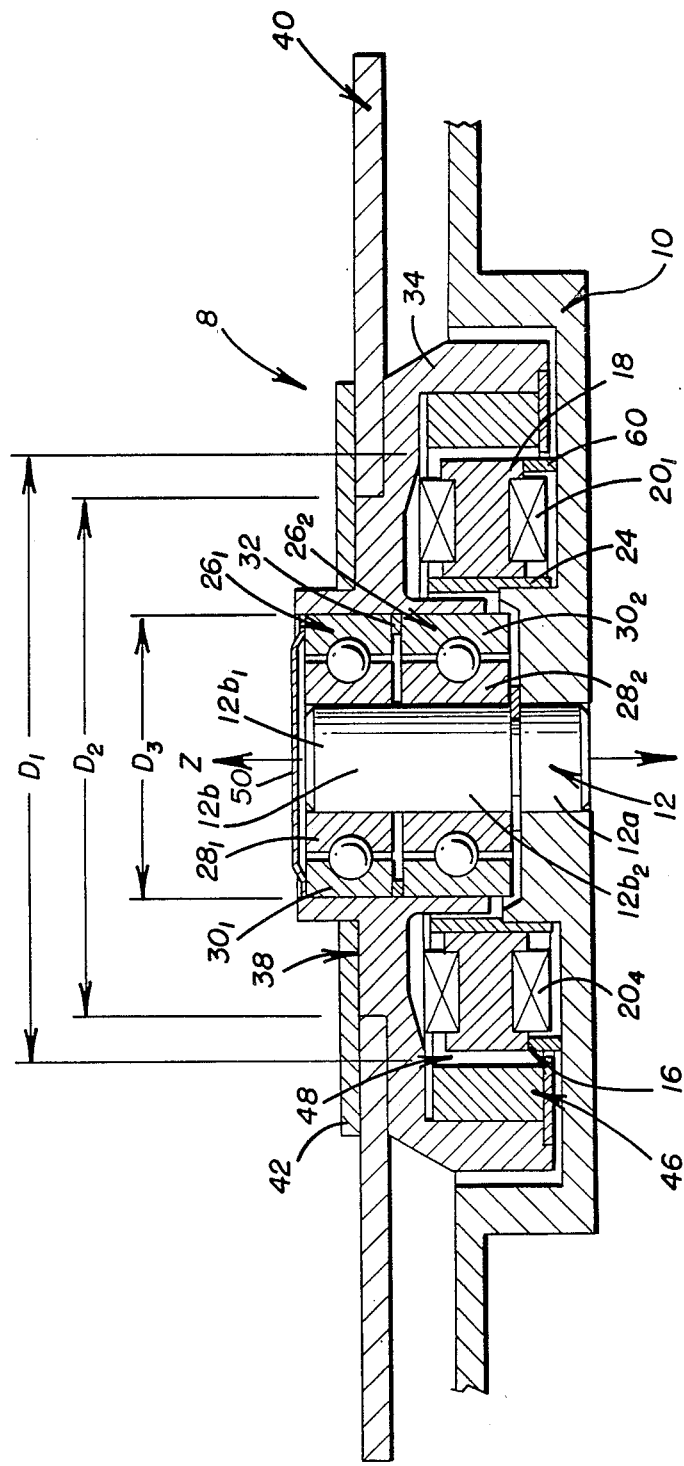
FIG. 1 is a sectional view of a disk drive spin motor in accordance with the first embodiment of the present invention.

The preferred embodiments of the present invention are implemented in under-the-hub spin motors. First, second and third embodiments of spin motors in accordance with the present invention will be described with reference to FIGS. 1–4. Spin motors in accordance with the present invention may be brushless DC motors operated in accordance with the method disclosed in copending application Ser. No. 163,222, which is hereby incorporated by reference. However, the principles of the present invention are applicable to brushless motors operated in accordance with other methods and motors utilizing brushes—although such motors are usually not desirable in disk drives—and to motors in which either the armature or magnets rotate.

Under-the-hub spin motors 7, 8 in accordance with first and third embodiments of the present invention are illustrated in and will be described with reference to FIGS. 1, 2, and 5. Spin motors 7, 8 of the first embodiment of the present invention are stationary shaft motors in which a flange 10 rigidly supports motor shaft 12. Spin motors 7, 8 are attached to a disk drive by mounting flange 10 on the base plate (not shown) of the disk drive. A stator assembly 16, including a stator lamination 18 and a plurality of coils $20_{1-6}$ provided on stator lamination 18, is mounted on a collar 24, 24' provided on flange 10. Flange 10, shaft 12, and stator 16 comprise the stationary portion of spin motors 7, 8.

Shaft 12 has a first portion 12a, which mates with flange 10, and a second portion 12b. First and second bearings $26_{1-2}$ are respectively provided on first and second ends $12b_1$, $12b_2$ of the second portion of 12b of shaft 12. The inner races $28_{1-2}$ of bearings $26_{1-2}$ are glued to the second portion 12b of shaft 12 in a preloading process described below. Outer races $30_{1-2}$ of bearings $26_{1-2}$ are separated by a spacer 32.

Hub 34 has an inner bearing surface 36 which mates with outer races $30_{1-2}$ so that hub 34 is supported by and rotates on bearings $26_{1-2}$. A disk support surface 38 provided on hub 34 is oriented so that the axis Z of shaft 12 is normal to the plane of disk support surface 38. Disk 40 rests on disk support surface 38 and is held in place by a retainer 42 which is attached to hub 34 by, for example, screws (not shown).

A rotor 46, comprising a multi-pole magnetic ring, is mounted on hub 34 so that rotor 46 is concentric with stator 16 and defines a gap 48 between stator 16 and rotor 46. Gap 48 has a diameter $D_1$ which is greater than the inside diameter $D_2$ of disk 40. Diameter $D_2$ is, in turn, greater than the diameter $D_3$ of inner bearing surface 36 of hub 34.

The under-the-hub design and the overlap of stator 16 and second bearing $26_2$, provide spin motors 7, 8 with an overall height along axis Z which is less than the total height of bearings $26_{1-2}$ and stator 16. The overlap and concentric relationship of stator 16 and second bearing $26_2$ aids in reducing the height of motors 7, 8.

Spin motors 7, 8 are not hermetically sealed, although spin motors having a hermetic seal could be fabricated in accordance with the present invention. Instead, motors 7, 8 rely on a cap 50 to control the flow of air through the motor. Without such a cap, motors 7, 8 would pump air through the motors, enhancing the possibility that contaminants from the motors would enter the controlled environment within the disk drive. To reduce the likelihood of contamination, bearings $26_{1-2}$ are sealed bearings and a labyrinth is formed between second bearing $26_2$ and the disk drive environment—the labyrinth has a path weaving around stator 16 and rotor 46.

Every spin motor has a resonant frequency or a peak in vibration frequency response. Problems with resistance to vibration often arise at applied vibration frequencies which are in phase with and thus add to the natural or internal vibrations of a spin motor. Accordingly, applied vibrations which fall at or near the resonant frequency can be the most troublesome vibrations.

The present invention was developed in response to a recognition that increasing the resonant frequency of a spin motor would increase the vibration tolerance of the spin motor. Thus, the spin motor and the disk drive in which the spin motor is mounted have a higher resonant frequency and are tolerant to applied vibrations of a larger frequency and amplitude range. It was also determined that an increase in the resonant frequency of spin motors 7, 8 could be achieved by increasing the stiffness, or resistance to deflections, of flange 10. Tests performed by the assignee of the subject Application demonstrated that spin motor 8, having a structure as described above, has an operating vibration frequency response peak in a range of approximately 440–460 Hz.

Flange 10 is fabricated from aluminum. The stiffness of flange 10 was successfully increased by fabricating a flange from steel rather than aluminum. However, a steel flange presented the problems of an increase in weight of the spin motor and the difficulties and increased costs associated with manufacturing components with steel as opposed to aluminum.

The inventor discovered that a stabilizer ring 60, 60', which supports, or braces, outer diameter 16b of stator assembly 16 provides the desired increase in the stiffness of flange 10. It is believed that the increase in stiffness of flange 10 in the region surrounding shaft 12 is provided by (a) the box-like support reinforcement provided by flange 10, collar 24, 24', lamination 18 of stator assembly 16, and stabilizer ring 60, 60', or (b) to the resistance to movements of stator assembly 16 out of a plane normal to the Z-axis which is provided by stabilizer ring 60, 60', or both (a) and (b).

Stabilizer ring 60, 60' provides the desired increase in stiffness of flange 10, and the desired increase in resonant frequency, without adding a noticeable amount of weight to motors 7, 8. The increase in stiffness of flange 10 provided by stabilizer ring 60, 60' increases the operating frequency response peak for motor 8 by 60–70 Hz. Thus, a motor similar to motor 8 without a stabilizer ring has an operating frequency response peak of approximately 450 Hz, and motor 8 has an operating frequency response peak of approximately 510–520 Hz.

Figure 2:
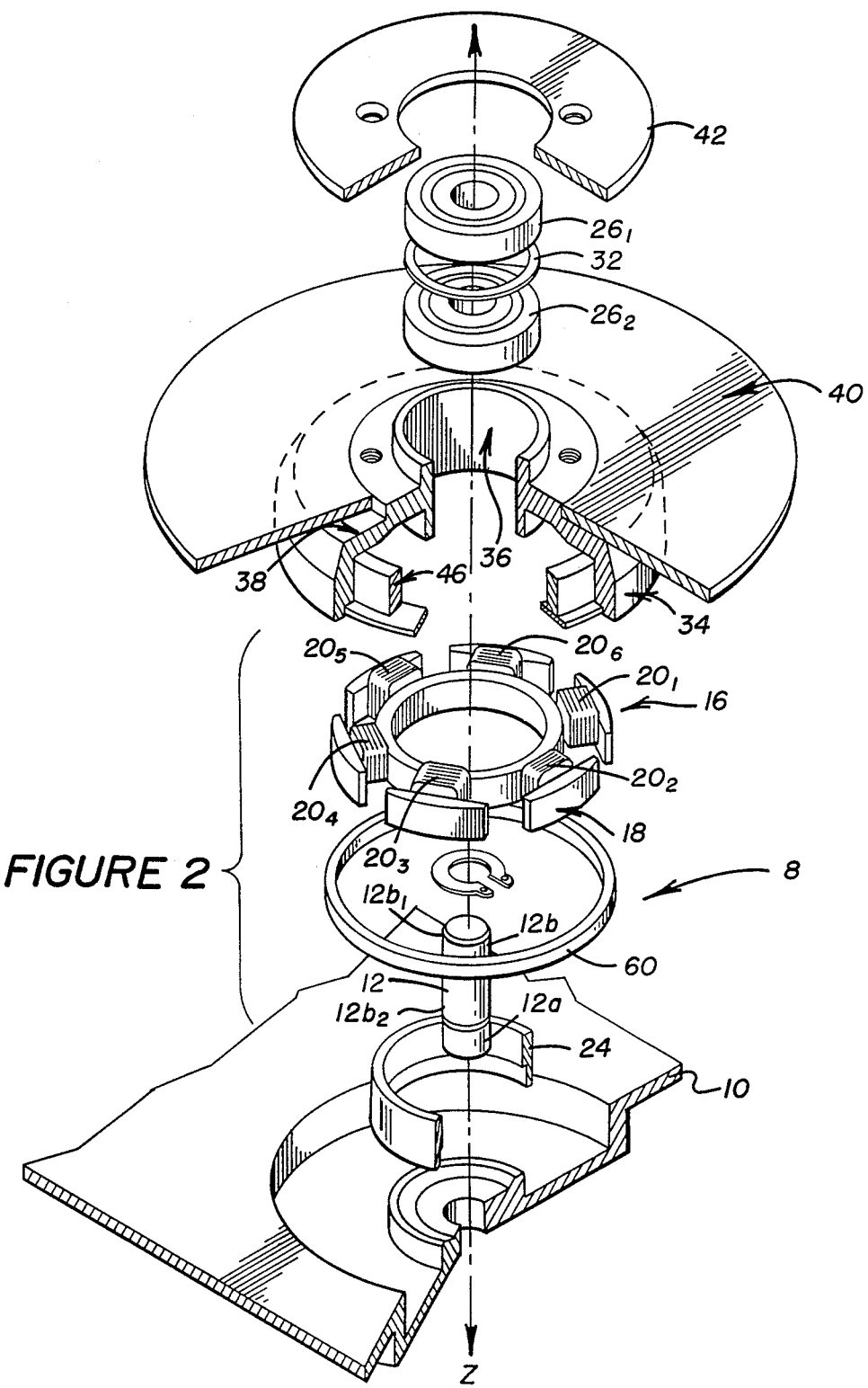
FIG. 2 is an exploded view of a disk drive spin motor in accordance with the first embodiment of the present invention.

In motor 7, shown in FIGS. 1 and 2, stabilizer ring 60 is a separate element in spin motor 7. In motor 8, shown in FIG. 5, stabilizer ring 60' is formed integrally with flange 10, preferably as a die cast feature of the flange 10. A further alternative for the structure of stabilizer ring 60, 60', is a series of posts supporting the various portions of stator lamination 18 associated with respective ones of windings $20_{1-6}$.

Figure 5:
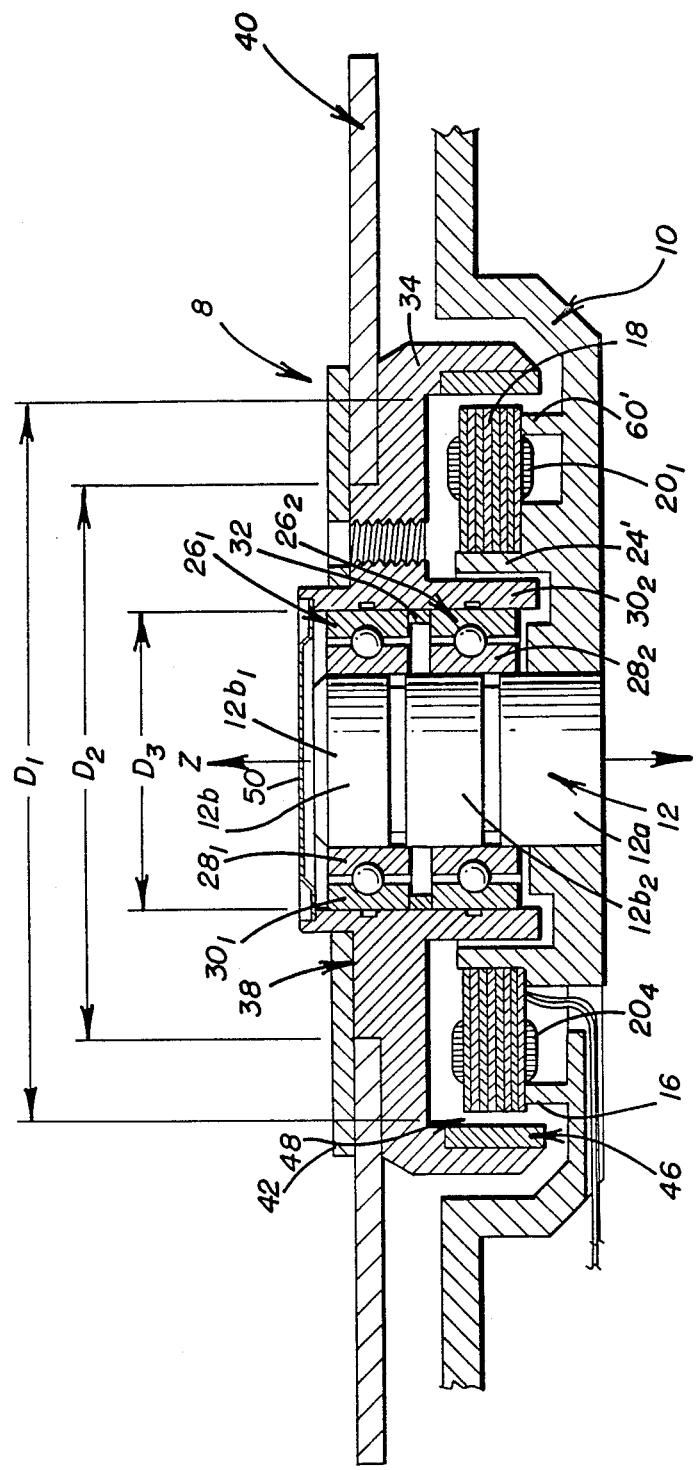
FIG. 5 is a section view of a disk drive spin motor in accordance with a third embodiment of the present invention.

As shown in FIG. 5, in the third embodiment of a spin motor in accordance with the present invention, collar 24' is formed integrally with flange 10, preferably as a die cast feature of flange 10, and has an L-shape which supports inner diameter 16a of stator assembly 16 in the radial direction and axial directions. In both the first and third embodiments, stator assembly 16 is glued to collar 24, 24' and stabilizer ring 60, 60'.

Figure 3:
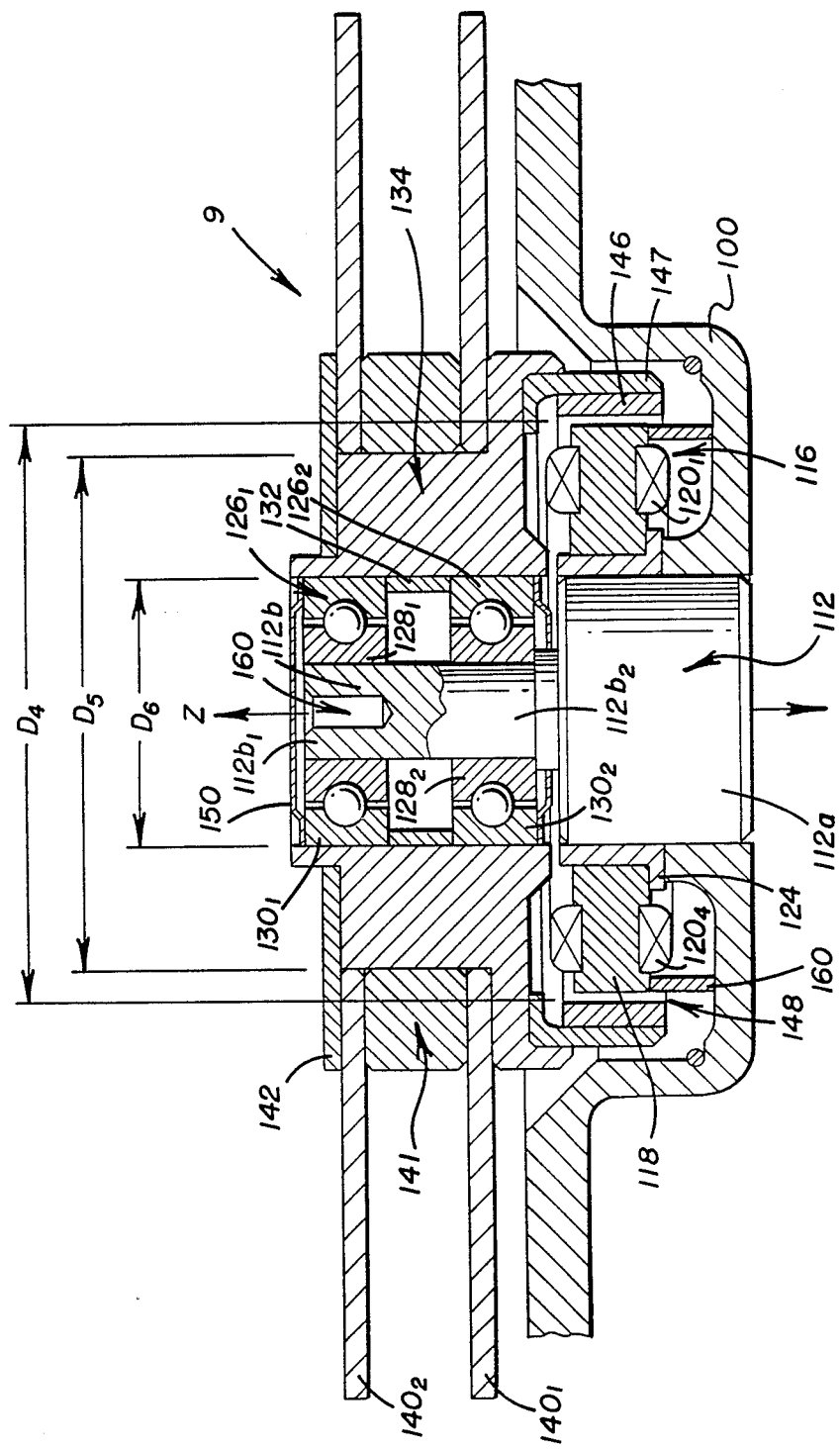
FIG. 3 is a sectional view of a disk drive spin motor in accordance with the second embodiment of the present invention.
Figure 4:
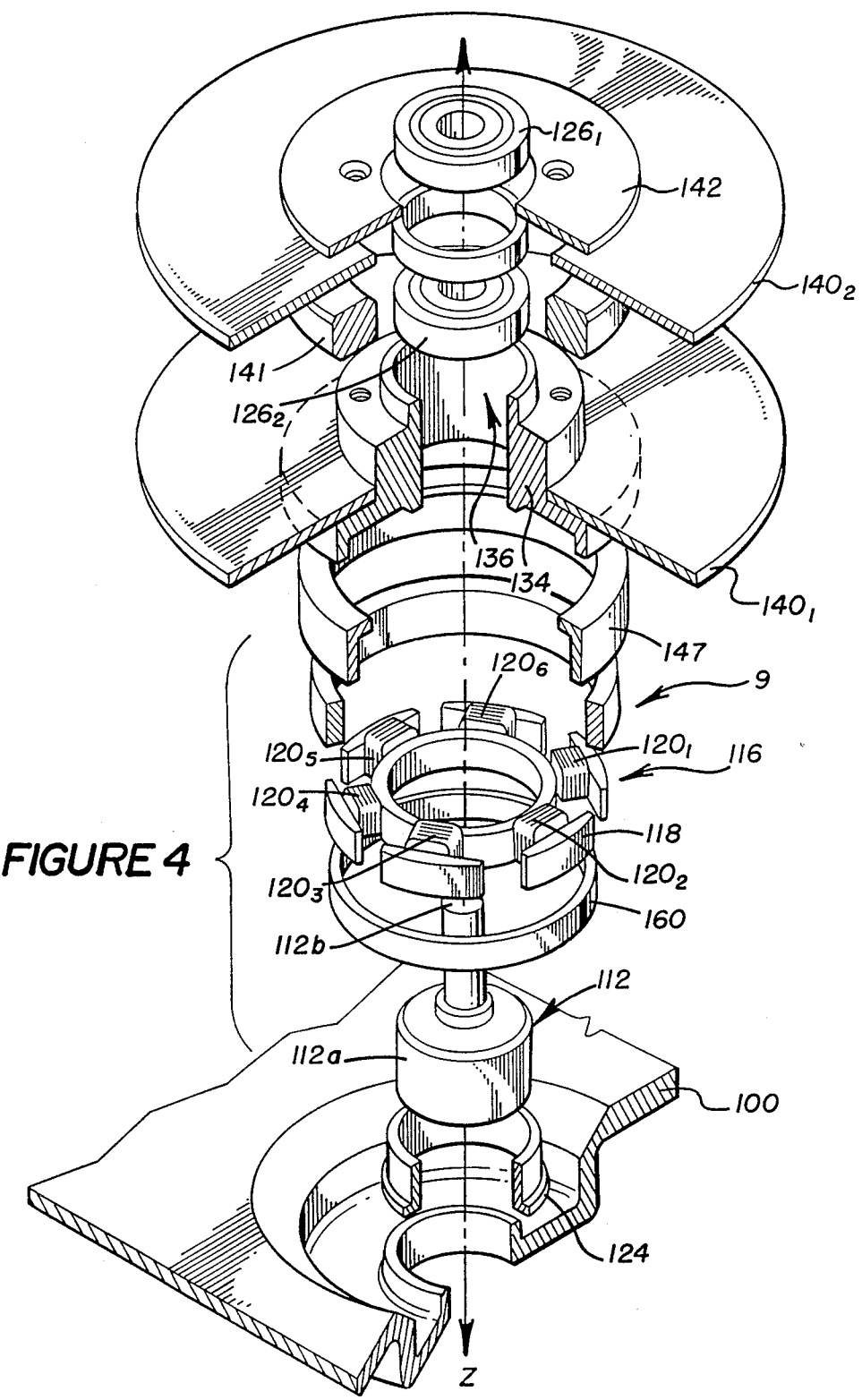
FIG. 4 is an exploded view of a disk drive spin motor in accordance with the second embodiment of the present invention.

An under-the-hub spin motor 9 constructed in accordance with the second embodiment of the present invention is illustrated in FIGS. 3 and 4. The second embodiment of the spin motor is also a stationary shaft motor. Spin motor 9 is attached to a disk drive by directly mounting a first portion 112a of shaft 112 to base plate 100 of the disk drive. To provide greater stability, first portion 112a of shaft 112 has a larger diameter than second portion 112b of shaft 112. The direct mounting of shaft 112 to the base plate eliminates one interface; whereas the first embodiment of the present invention has two interfaces (an interface between shaft 12 and flange 10 and an interface between flange 10 and the base plate) the second embodiment has only a single interface (the interface between shaft 112 and the base plate. Further, the direct mounting allows base plate 100 to act as a heat sink for spin motor 9.

A stator assembly 116, including a stator lamination 118 and a plurality of coils $120_{1-6}$ provided on stator lamination 118, is mounted on a collar 124 which surrounds a first portion 112a of shaft 112 and abuts base plate 100. In a spin motor 9 the use of two disks $140_{1-2}$ does not allow for an overlap of stator 116 and second bearing $126_2$. Shaft 112, and stator 116 comprise the stationary portion of spin motor 9.

First and second bearings $126_{1-2}$ are respectively provided on first and second ends $112b_1$, $112b_2$ of the second portion of 112b of shaft 112. The inner races $28_{1-2}$ of bearings $126_{1-2}$ are glued to the shaft 112 in a preloading process described below. Outer races $130_{1-2}$ of bearings $126_{1-2}$, which are separated by a spacer 132, support a hub 134 by contacting inner bearing surface 136 of hub 134.

The rotating elements of motor 9 comprise a hub assembly based on hub 34. Hub 134 has a disk support surface 138 which supports disk $140_1$, a second disk $140_2$ is separated from first disk $140_1$ by a spacer 141. As in the first embodiment, disk support surface 138 is oriented so that the axis Z of shaft 112 is normal to the plane of disk support surface 138. Disks $140_{1-2}$ are retained by retainer 142 attached to hub 134 by, for example screws (not shown).

Hub 134 is formed of aluminum to match the thermal expansion coefficients of thermal expansion of hub 134 and disks $140_{1-2}$. Differences in these coefficients could cause the disks $140_{1-2}$ to change position relative to hub 134 as the disks and the hub undergo thermal cycles. Further, in an aluminum hub 134 a bearing sleeve may be provided as an integral portion of hub 134, whereas a steel hub would require a bearing sleeve press-fit into the hub.

A rotor 146, comprising a multi-pole magnetic ring, is mounted on hub 134 by rotor collar 147. Rotor 146 is concentric with stator 116 and defines a gap 148 between stator 116 and rotor 146. As in the first embodiment, gap 148 has a diameter $D_4$ which is greater than the inside diameter $D_5$ of disks $140_{1-2}$, and diameter $D_5$ is, in turn, greater than the diameter $D_6$ of inner bearing surface 136 of hub 134.

A cap 150 attached to hub 134 and a labyrinth, similar to that of motor 8 of the first embodiment, prevent air from freely flowing through motor 9. The stiffness of base 100 of motor 9 is increased by adding stabilizer ring 160, having a structure similar to and performing the same function as stabilizer rings 60, 60'. Stabilizer ring 160 may be a separate element in spin motor 9 or may be formed integrally with base 100.

Stabilizer rings 60, 60', 160 are described in the context of an under-the-hub spin motor. It is to be understood, however, that stabilizer rings may be provided in spin motors having many different structures.

The under-the-hub design of motors 8, 9 provides a large gap diameter $D_4$, and thus a large gap radius $D_4/2$, which causes under-the-hub spin motors 7, 8 and 9 to generate more torque than in-hub motors having the same number of turns in windings $20_{1-2}$ $120_{1-6}$ and magnets providing the same field strength as magnets 46, 146 in rotors 46, 146, and using the same operating current as motors 7, 8 and 9. Further, since the torque produced by spin motors 7, 8 and 9 is also related to the current in windings $20_{1-6}$, $120_{1-6}$ spin motors 7, 8 and 9 can produce the same amount of torque as an in-hub motor having the same size windings and the same type magnet using a smaller current. The reduction in the current is important in reducing the heat produced by the motor and reducing the power required by the spin motor, and thus the overall power required by the disk drive incorporating spin motors 7, 8 or 9.

The under-the-hub design also provides space inside the motor for a larger number of turns in each of windings $20_{1-6}$, $120_{1-6}$ allowing the use of larger diameter wire in windings $20_{1-6}$, $120_{1-6}$. A large number of turns is desired in order to generate the highest possible back EMF, and larger wire reduces the resistance in windings $20_{1-6}$, $120_{1-6}$, allowing motors 7, 8 and 9 to operate at a lower voltage, for example 5 volts as opposed to the conventional operating voltage of 12 volts. For example, spin motor 9 has 70 turns of 36 gauge (0.0056" diameter) wire per winding $120_{1-6}$. Operated at 12 volts and 3600 rpm this motor produces a back EMF of 9 volts.

Preloading bearings $26_{1-2}$ and $126_{1-2}$ is performed by placing the bearings on the shaft with the appropriate spacing between outer races $30_{1-2}$, $130_{1-2}$, and then using a mechanical device to force the inner races $28_{1-2}$, $128_{1-2}$ towards one another with a carefully calibrated and constant force and maintaining this force while an adhesive used to attach bearings to the shaft cures. In spin motor 9, a threaded hole 160 is provided at the first end $112b_1$ of first portion 112b of shaft 112 so that a preloading tool may be attached shaft 112.

The many features and advantages of the spin motors of the first and second embodiments of the present invention will be apparent to those skilled in the art from the DESCRIPTION OF THE PREFERRED EMBODIMENTS. Thus, the following claims are intended to cover all modifications and equivalents falling within the scope of the invention.

What is claimed is:

1. A motor comprising:
   a shaft;
   a rotor;
   bearing means for rotatably mounting said rotor to said shaft;
   stator means for inducing said rotor to rotate, said stator means including a stator lamination having inner and outer diameters;
   base means for supporting said shaft and said inner diameter of said stator lamination; and
   a stabilizer ring, provided on said base, for supporting said outer diameter of said stator lamination.

2. A motor according to claim 1, wherein:
   said stabilizer ring is formed integrally with said base means;
   said shaft has a cylindrical axis;
   said bearing means mounts said rotor so that the rotation of said rotor is in a plane perpendicular to the cylindrical axis of said shaft; and
   said stator lamination is concentric with and lies in a plane perpendicular to the cylindrical axis of said shaft.

3. A spin motor for rotating a disk in a disk drive, comprising:
   a base;

a shaft having a first and second portions, said shaft being supported solely by mounting said first portion of said shaft in said base;

first and second bearings provided at respective first and second positions on said second portion of said shaft;

a hub, rotatably supported on said shaft by said first and second bearings, said hub having a disk support surface which is perpendicular to the axis of said shaft;

a stator assembly mounted on said base, said stator assembly having an outer diameter; and a stabilizer ring provided between said base and said outside diameter of said stator assembly.

4. A spin motor according to claim 3, wherein said stabilizer ring is formed integrally with said base.

5. A spin motor for rotating a disk in a disk drive, comprising:

a base of said disk drive, said base including a mounting hole, a cylindrical mounting member having an outer diameter, and a stabilizer ring having a diameter larger than and concentric with said cylindrical mounting member;

a shaft having a first and second portions and a cylindrical axis, said first portion of said shaft being mounted in said mounting holes;

first and second bearings provided at respective first and second adjacent positions on said second portion of said shaft;

a hub, rotatably supported on said shaft by said first and second bearings, said hub having a disk support surface which is perpendicular to the cylindrical axis of said shaft;

a stator assembly having an inner portion mounted on said outer diameter of said cylindrical mounting member and an outer portion mounted on said stabilizer ring.

6. An under-the-hub spin motor for rotating a disk in a disk drive, the disk having a mounting hole having a diameter, comprising:

a base;

a shaft having a first portion, a second portion, and a cylindrical axis, said first portion being mounted to the base;

a hub assembly, comprising:
   a hub including a bearing contact surface having a second diameter, and a disk support surface which is perpendicular to the cylindrical axis of said shaft, and
   a rotor mounted on said hub, said hub assembly having a center of mass;

first and second bearings rotatably supported said hub assembly on said second portion of said shaft so that said rotor is cantilevered with respect to the axial region between the first and second bearings and so that the center of mass of said hub assembly is positioned at a point on the cylindrical axis of said shaft between said first and second bearings;

a stator assembly provided on the base plate so that said rotor is concentric with said stator assembly, said stator assembly having an outer diameter greater than the diameter of the mounting hole in the disk; and a stabilizer ring contacting said outer diameter of said stator assembly, said stabilizer ring being formed integrally with said base plate.

7. An under-the-hub disk drive according to claim 6, wherein said base is the base of a disk drive.

8. An under-the-hub disk drive according to claim 6, wherein said base is a mounting flange having a portion for mounting to the base of a disk drive.

9. A motor comprising:

a base;

a rotor;

bearing means for rotatably mounting said rotor to said base;

stator means for inducing said rotor to rotate with respect to said base, said stator means including a stator lamination having an inner diameter and an outer diameter, said stator lamination being mounted on said base at said inner diameter; and a stabilizer ring, provided on said base, for supporting said stator lamination at said outer diameter.

10. A motor according to claim 9, wherein said stabilizer ring is formed integrally with said base.

11. A spin motor for rotating a disk in a disk drive, comprising:

a base;

a hub having a disk support surface, said hub including a cylindrical permanent magnet having an inside diameter;

first and second bearings for mounting said hub to said base so that said hub rotates;

a stator assembly having an inner diameter and an outer diameter, said outer diameter being concentric with said inside diameter of said permanent magnet;

said stator assembly being mounted on said base at said inner diameter of said stator assembly; and a stabilizer ring provided between said base and said stator assembly at said outer diameter of said stator assembly.

* * * * *